Figure 1:
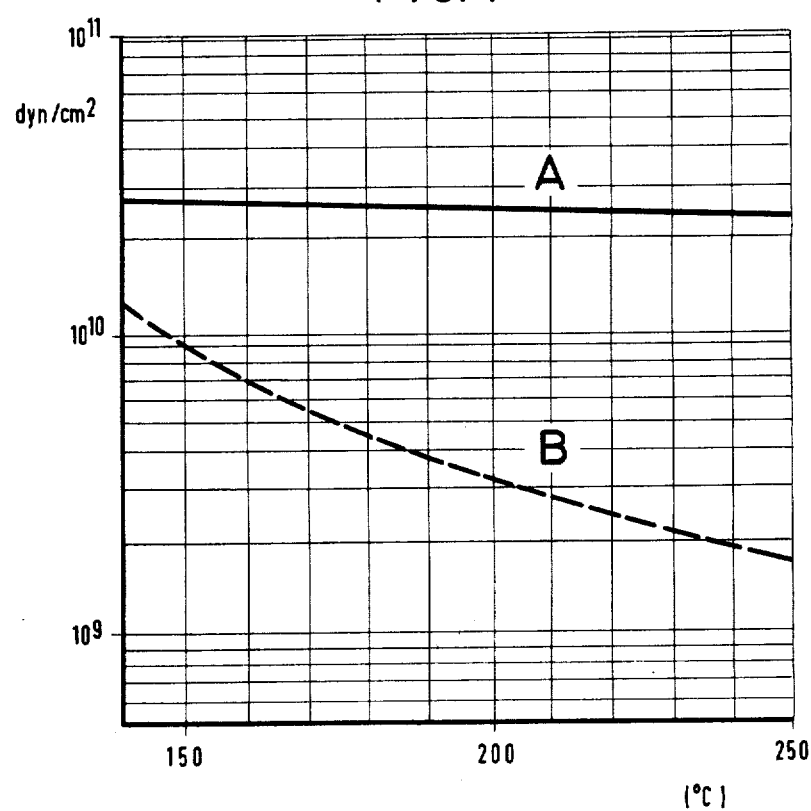

United States Patent
Rembold et al.

[11] 3,900,449
[45] Aug. 19, 1975

[54] STORAGE-STABLE AND THERMOSETTING MIXTURES

[75] Inventors: Heinz Rembold, Arlesheim; Theobald Haug, Frenkendorf; Sigfried Wyler, Dornach; Jurg Kiefer, Reinach, all of Switzerland

[73] Assignee: Ciba-Geigy Corporation, Ardsley, N.Y.

[22] Filed: June 14, 1973

[21] Appl. No.: 370,179

[30] Foreign Application Priority Data
July 4, 1972 Switzerland.................... 9991/72

[52] U.S. Cl......... 260/78 UA; 117/161 UZ; 161/46; 161/189; 161/192; 161/247; 252/63.7; 260/78.4 R; 264/109; 264/219
[51] Int. Cl. ......................................... C08f 17/00
[58] Field of Search ....... 260/78.4 RN, 78 UA, 93.1

[56] References Cited
UNITED STATES PATENTS

| | | | |
|---|---|---|---|
| 2,726,232 | 12/1955 | Upson | 260/93.1 |
| 3,188,303 | 6/1965 | Dissen | 260/78.4 |
| 3,236,916 | 2/1966 | Wulff | 260/869 |
| 3,322,572 | 5/1967 | Renner et al. | 117/232 |
| 3,445,482 | 5/1969 | Schmerling | 260/347.8 |
| 3,462,407 | 8/1969 | Witschard et al. | 260/94.7 |

FOREIGN PATENTS OR APPLICATIONS
1,171,061  11/1969  United Kingdom

*Primary Examiner*—Joseph L. Schofer
*Assistant Examiner*—John Kight, III.
*Attorney, Agent, or Firm*—Charles W. Vanecek; Nestor W. Shust

[57] ABSTRACT

Mixtures which on curing give moulded materials of good electrical properties and high resistance to heat-aging, and which are characterised in that they contain a) N,N'-bis-imides of maleic acid, dimethylmaleic acid, citraconic acid or itaconic acid and b) dimeric or oligomeric halogen-containing bis-(cyclopentadienyl) compounds such as, for example, oligomeric $\alpha,\alpha'$-bis-(cyclopentadienyl)-2,3,5,6-tetrachloro-p-xylene, optionally mixed with dimeric or oligomeric halogen-free bis-(cyclopentadienyl) compounds such as, for example, hexamethylene-bis-(cyclopentadiene).

The mixtures are suitable for the manufacture of moulded materials of all kinds, especially for the manufacture of high quality insulating material.

8 Claims, 2 Drawing Figures

STORAGE-STABLE AND THERMOSETTING MIXTURES

The present invention relates to storage-stable, thermosetting mixtures of N,N'-bis-imides of certain unsaturated dicarboxylic acids and dimeric or oligomeric halogen-containing bis-(cyclopentadienyl) compounds, and to a process for the manufacture of moulded materials from these thermosetting mixtures.

U.S. Pat. No. 2,726,232 has already described the manufacture of a polymeric product by reaction of α,α'-bis-(cyclopentadienyl)-p-xylene with N,N'-1,3-phenylene-bis-maleimide. This insoluble product obtained under extreme reaction conditions admittedly shows a relatively high softening point but it is friable and brittle and hence unsuitable for use as a moulded material for most technical applications, because of this poor mechanical behaviour. As compared to the moulded materials manufactured from N,N'-bis-imides of unsaturated dicarboxylic acids and diamines, according to French Patent Specification No. 1,555,564, the moulded materials manufactured from the curable mixture according to the present invention possess better dielectric properties for approximately equally good mechanical properties.

British Patent Specification No. 1,171,061 has already described dimeric and oligomeric α,α'-bis-(cyclopentadienyl)-tetrahalogenoxylenes which can be cured by heating, if appropriate in the presence of a curing catalyst, to give moulded materials having good mechanical and dielectric properties. However, these moulded materials have the disadvantage that they do not possess a high long-term resistance to heat. At temperatures above 150°C, these moulded materials undergo rapid heat aging, with corresponding losses of their good mechanical and dielectric properties. This situation is discussed in more detail in the publication by H. Rembold "Bisdienharz, ein neuer Bindemitteltyp fur Elektrolaminate" ("Bis-diene resin, a new type of binder for laminates for electrical purposes") in "Kunststoffe", Volume 60, Issue 11, pages 879–882 (1970), and the lack of long-term heat resistance of these moulded materials above 150°C is interpreted as due to retro-Diels-Alder reaction occurring at elevated temperature.

It has now been found that mixtures of N,N'-bisimides of certain unsaturated dicarboxylic acids and dimeric or oligomeric halogen-substituted α,α'-bis(cyclopentadienyl)xylenes on the one hand have extraordinarily good storage stability at room temperature and on the other hand yield, on curing, moulded materials which possess good mechanical and good dielectric properties up to very high temperatures and, surprisingly, have high resistance to heat aging even at 200°C. The very good resistance to heat aging and the dielectric losses, which remain low up to 200°C, of these new moulding materials permit the use of the new resin mixture for the manufacture of high quality insulating material.

Accordingly, the present invention relates to new, storage-stable, thermosetting mixtures which are characterised in that they contain (a) N,N'-bis-imides of unsaturated dicarboxylic acids of the general formula

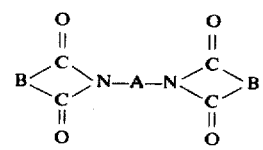

in which A denotes a divalent organic radical with at least 2 and at most 30 carbon atoms and B denotes a radical of the formulae

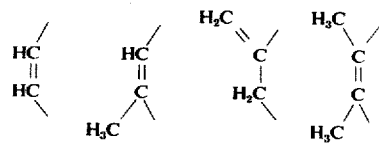

and (b) dimeric or oligomeric halogen-containing bis-(cyclopentadienyl) compounds of the general formula

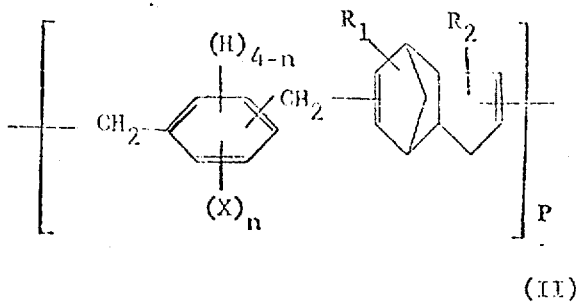

in which X denotes a fluorine, chlorine or bromine atom, $R_1$ and $R_2$ each denote a hydrogen atom or a methyl group, $n$ denotes an integer having a value of at least 1 and at most 4 and P denotes a number having a value of 2 to 20, it being optionally possible for component (b) to be replaced, to the extent of up to 50 mol per cent by bis-(cyclopentadienyl) compounds of the formula III

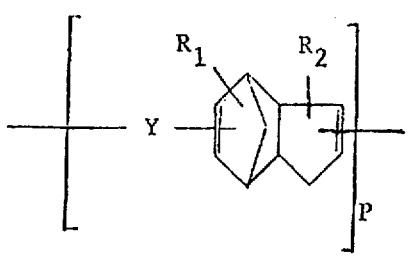

in which Y denotes a radical of the formulae

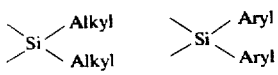

or a divalent aliphatic, cycloaliphatic, araliphatic or aromatic hydrocarbon radical and $R_1$, $R_2$ and P have the same meaning as in the formula II.

Preferably, the thermosetting mixtures contain (a) N,N'-bis-imides of the formula I in which A represents an unsubstituted or chlorine-substituted radical of the formula

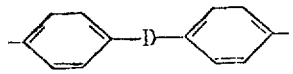

wherein D denotes an oxygen atom or the methylene group, and (b) oligomeric bis-(cyclopentadienyl) compounds of the formula II, in which $n$ is 4, X denotes a chlorine atom and $R_1$ and $R_2$ each denote a hydrogen atom, it being optionally possible for component (b) to be replaced to the extent of up to 50 mol per cent by oligomeric bis-(cyclopentadienyl) compounds of the formula III, in which Y denotes a divalent aliphatic radical, especially the hexamethyl radical, and $R_1$ and $R_2$ have the same meaning as above.

The bis-imides of the formula I are a known class of compound and can be manufactured by use of the methods described in U.S. Pat. No. 3,010,290 and British Patent Specification No. 1,137,592, by reacting the corresponding diamines with the unsaturated dicarboxylic acid anhydrides in a polar solvent and in the presence of a catalyst.

The symbol A in the formula I can denote a linear or branched alkylene radical with fewer than 20 carbon atoms, a phenylene radical, a cyclohexylene radical or a radical of the formula

in which $a$ represents an integer from 1 to 3.

The symbol A can also comprise several phenylene or cyclohexylene radicals which are linked directly or by a simple valency bond or by an atom or a divalent inert group, such as, for example, oxygen or sulphur atoms or alkylene groups with 1 to 3 carbon atoms, or the following groups: —CO—, —SO$_2$—, —NR$_1$—, —N N—, —CONH—, —COO— and —CONH—A—HN-CO—.

Furthermore, the various phenylene or cyclohexylene radicals can be substituted by methyl groups.

The symbol A can also represent the grouping

Herein, $R_3$, $R_4$, $R_5$ and $R_6$ denote hydrogen atoms or identical or different aliphatic hydrocarbon radicals with 1-6 carbon atoms, and $R_3$ and $R_4$ together with the carbon atom in position 5 and can also form a 5-membered or 6-membered aliphatic ring.

The following may be mentioned as special examples of bis-imides of the formula I: N,N'-ethylene-bis-maleimide, N,N'-hexamethyl-bis-maleimide, N,N'-m-phenylene-bis-maleimide, N,N'-p-phenylene-bis-maleimide, N,N'-4,4'-diphenylmethane-bis-maleimide, N,N'-4,4'-3,3'-dichloro-diphenylmethane-bis-maleimide, N,N'-4,4'-diphenyl-ether-bis-maleimide, N,N'-4,4'-diphenylsulphone-bis-maleimide, N,N'-4,4'-dicyclohexylmethane-bis-maleimide, N,N'-α,α'-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N'-m-phenylene-bis-citraconimide, N,N'-4,4'-diphenylmethane-bis-citraconimide, N,N'-4,4'-2,2-diphenylpropane-bis-maleimide, N,N'-γ,γ'-1,3-dipropylene-5,5-dimethylhydantoin-bis-maleimide, N,N'-4,4'-diphenylmethane-bis-itaconimide, N,N'-p-phenylene-bis-itaconic acid imide, N,N'-4,4'-diphenylmethane-bis-dimethylmaleimide, N,N'-4,4'-2,2-diphenylpropane-bis-dimethylmaleimide, N,N'-hexamethylene-bis-dimethylmaleimide, N,N'-4,4'-diphenyl-ether-bis-dimethylmaleimide and N,N'-4,4'-diphenylsulphone-bis-dimethylenemaleimide.

The dimeric and oligomeric halogen-containing bis(cyclopentadienyl) compounds of the formula II are known compounds and are obtained according to the process described in British Patent Specification No. 1,171,061 by reaction of bis-(chloromethyl)-halogenobenzenes with cyclopentadienylsodium. As examples of bis-(cyclopentadienyl) compounds of the formula II there may be mentioned: dimeric and oligomeric α,α'-bis-(cyclopentadienyl)-2,3,5,6-tetrachloro-p-xylene, dimeric and oligomeric α,α'-bis-(cyclopentadienyl)-2,3,5-trichloro-p-xylene, dimeric and oligomeric α,α'-bis-(methylcyclopentadienyl)-2,3,5,6-tetrachloro-p-xylene, dimeric and oligomeric α,α'-bis-(cyclopentadienyl)-2,3,5,6-tetrachloro-m-xylene, dimeric and oligomeric α,α'-bis-(cyclopentadienyl)-2,3,5,6-tetrachloro-o-xylene, dimeric and oligomeric α,α'-bis-(cyclopentadienyl)-2,3,5,6-tetrabromo-p-xylene, dimeric and oligomeric α,α'-bis-(cyclopentadienyl)-2,3,5-tribromo-p-xylene, dimeric and oligomeric α,α'-bis-(methylcyclopentadienyl)-2,3,5,6-tetrabromo-p-xylene, dimeric and oligomeric α,α'-bis-(cyclopentadienyl)-2-bromo-p-xylene, dimeric and oligomeric α,α'-bis-(cyclopentadienyl)-2,3,5,6-tetrafluoro-p-xylene, dimeric and oligomeric α,α'-bis-(cyclopentadienyl)-2,3,5-trifluoro-p-xylene, dimeric and oligomeric α,α'-bis-(methylcyclopentadienyl)-2,3,5,6-tetrafluoro-p-xylene and dimeric and oligo-

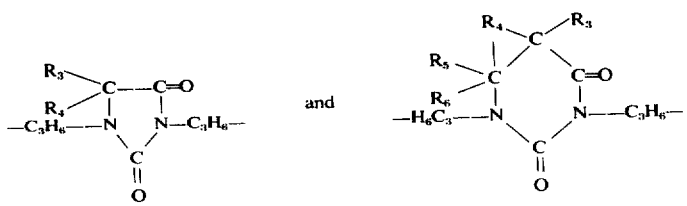

meric α,α'-bis-(cyclopentadienyl)-2,5-difluoro-p-xylene.

The dimeric and oligomeric bis-(cyclopentadienyl) compounds of the formula III are also known compounds and are manufactured analogously to the compounds of the formula II by reaction of alkali metal compounds or Grignard compounds of cyclopentadiene or methylcyclopentadiene with the appropriate dihalogen compounds. The compounds of the formula III and their manufacture are described in German Patent Specification No. 1,440,893.

Possible dimeric or oligomeric bis-(cyclopentadienyl) compounds of the formula III which can be used in the form of their dimers or oligomers are: bis-(cyclopentadienyl)-methane, bis-(cyclopentadienyl)-phenylmethane, 1,3-bis-(cyclopentadienyl)-propane, 1,5-bis-(cyclopentadienyl)-pentane, 1,6-bis-(cyclopentadienyl)-hexane, 1,9-bis-(cyclopentadienyl)-nonane, 1,4-bis-(cyclopentadienyl)-butene-2, α,α'-bis-(cyclopentadienyl)-p-xylene, 4,6-bis-(cyclopentadienyl-methyl)-1,3-dimethylbenzene, 1,3-bis-(cyclopentadienyl-methyl)-2,4,6-trimethylbenzene, 1,4-bis-(cyclopentadienyl)-cyclopentene-2,di-cyclopentadienyl-dimethyl-silane, bis-(methylcyclopentadienyl)-dimethyl-silane and di-cyclopentadienyl-diphenylsilane.

The curable mixtures according to the present invention advantageously only consist of the compounds of the formulae I and II. If the curable mixtures optionally also contain bis-(cyclopentadienyl) compounds of the formula III, the proportion of these compounds in the curable mixture should be so chosen that it does not amount to more than 50 mol per cent relative to the halogen-containing bis-(cyclopentadienyl) compounds of the formula II, since otherwise the outstanding dielectric properties of the cured moulded materials are no longer assured.

In the curable mixtures, the molar ratio of N,N'-bis-imides of the formula I to the bis-(cyclopentadienyl) compounds of the formulae II and optionally III is about 1:4 to 4:1, but preferably 1:2 to 2:1.

The curable mixtures which are storage-stable at room temperture can also consist of several compounds of the indicated formulae I to III.

The curing of the mixtures according to the invention is effected by warming the mixtures to temperatures between 100° and 280°C, preferably 150° and 250°C, whereupon the mixtures are converted, without evolution of volatile reaction products, into crosslinked, insoluble and infusible products.

It is also possible first to manufacture a prepolymer from the mixtures according to the invention by heating the homogeneously mixed starting materials, which optionally have been finely ground, temporarily to 50°–120°C so that a partially soluble product, which is still thermoplastic, is produced. This prepolymer must, where necessary, again be ground to a processible powder. The prepolymerisation can also be effected by heating a solution or suspension of the starting materials. For this, substances can be used which do not react with the starting materials and which, if desired, dissolve them adequately. Such liquids are, for example: dimethylformamide, tetramethylurea, dimethylsulphoxide, N-methylpyrrolidone, dichloroethylene, tetrachloroethylene, tetrachloroethane, tetrabromoethane, chlorobenzene, dichlorobenzene, bromobenzene, cyclohexanone, dioxane or alkylated aromatic hydrocarbons.

For some technical applications the addition of a curing catalyst is advantageous. The cured stage is reached more rapidly by adding, for example, a small amount of a peroxide. For this, peroxides such as di-tert.-butyl peroxide, dilauryl peroxide, dicumyl peroxide or tert.-butyl cumyl peroxide, used in a concentration of 0.01–5 per cent, preferably 0.25–0.5 per cent, relative to the total weight of the curable mixture, are suitable. It is however also possible to employ other, non-peroxidic curing accelerators, or additives which have a favourable influence on the curing reaction.

Hence, a further subject of the invention is a process for the manufacture of crosslinked, insoluble and infusible plastics products, characterized in that N,N-bis-imides of unsaturated dicarboxylic acids of the formula I and dimeric or oligomeric bis-(cyclopentadienyl) compounds of the formula II and optionally of the formula III, are reacted with one another, optionally in the presence of a curing catalyst, at temperatures between 100° and 280°C.

Preferably, the following are reacted in the process:

a. N,N'-bis-imides of the formula I in which A represents an unsubstituted or chlorine-substituted radical of the formula

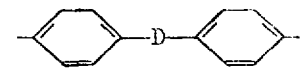

wherein D denotes an oxygen atom or the methylene group, with b. oligomeric bis-(cyclopentadienyl) compounds of the formula II, in which $n$ is 4, X denotes a chlorine atom and $R_1$ and $R_2$ each denote a hydrogen atom, it being possible for the component (b) to be replaced, to the extent of up to 50 mol per cent, by oligomeric bis-(cyclopentadienyl) compounds of the formula III in which Y denotes a divalent aliphatic radical, especially the hexamethylene radical, and $R_1$ and $R_2$ have the same meaning as above.

The manufacture, according to the invention, of the crosslinked, infusible products is as a rule carried out with simultaneous shaping, to give mouldings, sheet-like structures, laminates or glue bonds. The additives which are customary in the technology of thermosetting plastics, such as fillers, plasticisers, pigments, dyestuffs, mould release agents and flameproofing substances can be added to the curable compositions. Glass fibres, mica, quartz powder, kaolin, colloidal silicon dioxide or metal powders can be used as fillers whilst, for example, calcium stearate can serve as a mould release agent.

Shaping can be effected by brief, rapid heating to, preferably, 170°–250°C at a pressure of 1–200 kp/cm². The mouldings thereby produced already possess adequate mechanical strength so that their curing can be completed outside the press, in an oven to 200°–280°C.

If a prepolymer is first manufactured from the curable mixtures, it can be used, ground to a fine powder, as a surface protection agent, by employing the fluidised bed process.

A solution or suspension of the prepolymer in a suitable solvent can be used for the manufacture of laminates, by impregnating porous sheet-like structures such as fabrics, fibre mats or fibre fleeces, especially glass fibre mats or glass fibre fabrics, with solutions or suspensions, and impregnating the solvent by a drying process. The further curing takes place in a press, preferably at 170°–250°C and 5–200 kp/cm² pressure. It is also possible merely to pre-cure the laminates in the press and to post-cure the products thus obtained in an oven at 200°–280°C until optimum use properties are achieved.

EXAMPLES

A. Manufacture and Properties of Unfilled Films

EXAMPLE 1

3.6 g (0.007 mol) of a 73% strength solution of an oligomeric α,α′-bis-(cyclopentadienyl)-2,3,5,6-tetrachloro-p-xylene (bis-diene I) in xylene and 2.5 g (0.007 mol) of N,N′-4,4′-diphenylmethane-bis-maleimide (bis-imide I) were mixed with 7 ml of ethylene chloride to give a homogeneous emulsion and the mixture was cured on a tinplate support to give a smooth, transparent, flexible film.

Curing conditions: 2 hours at 80°C, 2.5 hours at 120°C, 2.5 hours at 160°C and 2.5 hours at 180°C.

EXAMPLE 2

9.60 g (0.0186 mol) of a 73% strength solution of bis-diene I in xylene and 3.30 g (0.0092 mol) of bis-imide I were thoroughly mixed, freed of the solvent and ground to a fine powder. This powder was pressed for 15 minutes at 180°C and a pressure of 35 atmospheres, in a frame of 1 mm thick polytetrafluoroethylene (Teflon), between two 1 mm thick Teflon layers, so as to give a film. This film was postcured for 4 hours in an oven at 220°C, and a smooth, transparent, flexible, film resulted.

EXAMPLE 3

1.30 g (0.0025 mol) of a 73% strength solution of the bis-diene I in xylene and 0.80 g (0.005 mol) of the bisimide I were mixed with 6 ml of ethylene chloride to give a homogeneous emulsion and cured on a tinplate support to give a smooth, transparent, flexible film. The film does not dissolve when placed in hot dimethylformamide at 120°C for 1 hour.

Curing conditions: 1.5 hours at 80°C, 1 hour at 100°C, 0.5 hour at 120°C, 1 hour at 140°C, 2 hours at 180°C and 3 hours at 220°C.

EXAMPLE 4

A mixture of 0.26 g (0.00125 mol) of oligomeric 1,6-hexamethylene-bis-cyclopentadiene (bis-diene II) and 0.54 g (0.00145 mol) of bis-diene I as well as 1.92 g (5.4 mols) of bis-imide I were mixed with 1.2 ml of xylene and 5 ml of ethylene chloride to give a homogeneous emulsion. This was cured on a smooth tinplate surface to give a smooth, transparent, flexible film.

Curing conditions: 1.5 hours at 80°C, 1 hour at 120°C, 3 hours at 180°C and 3 hours at 210°C.

COMPARISON EXAMPLE 1

In accordance with French Patent Specification No. 1,555,564, a solution of 5.40 g (0.015 mol) of bis-imide I, 1.50 g (0.0075 mol) of 4,4′-diaminodiphenylmethane and 0.1 g of N-phenyl-β-naphthylamine was dissolved in 20 ml of ethylene chloride, warmed to 80°C for 1.5 hours and cured on a smooth tinplate support to give a smooth, transparent, flexible film.

Curing conditions: 1 hour at 80°C, 1 hour at 120°C, 2 hours at 150°C, 2 hours at 180°C and 3 hours at 220°C.

EXAMPLE 5

9.60 g (0.0186 mol) of a 73% strength solution of the bis-diene I in xylene and 3.8 g (0.0092 mol) of N,N′-4,4′-3,3′-dichlorodiphenylmethane-bis-maleimide (bis-imide II) were thoroughly mixed, freed of the solvent and ground to a fine powder. This powder was pressed in the apparatus described in Example 2, under the same conditions, to give a film which was post-cured for 4 hours in an oven at 220°C; a smooth, flexible film resulted.

EXAMPLE 6

9.60 g (0.0186 mol) of a 73% strength solution of the bis-diene I in xylene and 3.30 g (0.0092 mol) of N,N′-4,4′-diphenyl-ether-bis-maleimide (bis-imide III) were thoroughly mixed, freed of the solvent and ground to a fine powder. This powder was pressed in the apparatus described in Example 2, under the same conditions, to give a film which was post-cured for 4 hours in an oven at 220°C; a smooth, flexible film resulted.

The films manufactured in the preceding examples were subjected to a thermo-mechanical and thermo-gravimetric test. The thermo-mechanical test was carried out with the "T MS-1" instrument of Messrs. Perkin-Elmer at a speed of heating of 10°C/minute. The thermo-gravimetric analysis was carried out in dry air with the "Recording Vacuum Thermoanalyzer TA-1" of Messrs. Mettler, using a sample of 50 mg and a speed of heating of 2°C/minute. In the thermo-gravimetric analysis, a curve of the weight of the sample as a function of the temperature is recorded ("thermo-gravimetric curve") and at the same time the first derivative of this thermo-gravimetric curve ("differentiated thermo-gravimetric curve") is drawn. The temperature of maximum speed of evaporation is the position of maximum slope of the thermo-gravimetric curve; at this temperature, the differentiated thermo-gravimetric curve shows a maximum. The proportion by weight which corresponds to the zone between two minima of the differentiated thermogravimetric curve is described as a fraction. The results of measurements carried out by these methods of investigation are listed in Table 1.

The results of the measurements show that the films manufactured from the mixtures according to the invention in every case have a higher starting point of softening than the film manufactured according to Comparison Example 1. The advantages of the new moulded materials are also shown by the thermo-gravimetric test of the films according to Examples 3 and 4, in which the temperatures of maximum speed of evaporation and of the beginning and end of decomposition are higher than for the film manufactured according to Comparison Example 1.

Table 1

| Film according to Example | Thermo-mechanical test beginning of softening, at °C | Thermo-gravimetric test | | | | | | Decomposition | |
|---|---|---|---|---|---|---|---|---|---|
| | | Temperature of maximum speed of evaporation | | | Proportion by weight of the fraction | | | beginning, °C | end, °C |
| | | 1 | 2 | 3 | 1 | 2 | 3 | | |
| 1 | 240 | 65 | 453 | 586 | 0.6 | 34.6 | 65.4 | 290 | 670 |
| 2 | 271 | 10 | 455 | 550 | 0 | 32.9 | 66.4 | 290 | 610 |
| 3 | 272 | 85 | 463 | 600 | 1.0 | 28.3 | 70.7 | 352 | 650 |

Table I —Continued

| Film according to Example | Thermo-mechanical test beginning of softening, at °C | Temperature of maximum speed of evaporation | | | Thermo-gravimetric test Proportion by weight of the fraction | | | Decomposition | |
|---|---|---|---|---|---|---|---|---|---|
| | | 1 | 2 | 3 | 1 | 2 | 3 | beginning, °C | end, °C |
| 4 | 238 | 86 | 448/520 | 616 | 0.8 | 24.5/ 13.9 | 60.8 | 340 | 680 |
| Comparison | | | | | | | | | |
| 1 | 237 | 60 | 402 | 590 | 1.4 | 16.3 | 82.3 | 320 | 640 |
| 5 | 247 | | 445 | 580 | 0 | 33.5 | 64.5 | 302 | 630 |
| 6 | 265 | | 430 | 544 | 0 | 33.4 | 65.1 | 298 | 680 |

B. Manufacture and properties of compression moulding compositions filled with glass fibres

EXAMPLE 7

357 g (0.698 mol) of a 73% strength solution of oligomeric α,α'-bis-(cyclopentadienyl)-2,3,5,6-tetrachloro-p-xylene (bis-diene I) in xylene, 250.0 g (0.698 mol) of N,N'-4,4'-diphenylmethane-bis-maleimide (bis-imide I) and 2.5 g of N-phenyl-β-naphthylamine were largely dissolved in 750 ml of chloroform and thereafter the solvents were again stripped off by means of a rotary evaporator. A light yellow powder remains.

300 g of this powder were thoroughly mixed with 442.5 g of ground glass fibres and 7.5 g of zinc stearate. To test the mechanical properties, the mixture was pressed at 160°C and 250 kp/cm² for 8 minutes to give mouldings of size 120 × 15 × 10 mm. To test the electrical properties, discs of diameter 140 mm and thickness 2 mm were pressed at 240°C and 250 kp/cm² for 4 minutes.

Before testing, these mouldings were post-cured for 4 hours at 220°C.

EXAMPLE 8

7,440 g (2.00 mols) of a 10% strength solution of bis-diene I in xylene, 1,432 g (4.0 mols) of bis-imide I and 14.3 g of N-phenyl-β-naphthylamine were mixed and freed of solvent by means of a rotary evaporator; a light yellow powder remained. 400 g of this powder were mixed with 590 g of ground glass fibres and 10 g of zinc stearate. To test the mechanical and electrical properties, test specimens were manufactured according to Example 7 and were post-cured for 4 hours at 220°C.

EXAMPLE 9

120.0 g (0.322 mol) of bis-diene I and 60.0 g (0.28 mol) of oligomeric hexamethylene-bis-cyclopentadiene (bisdiene II) in 45 g of xylene and 226 g (0.63 mol) of bisimide I in 100 ml of chloroform were thoroughly mixed and thereafter the mixture was freed of the solvent by means of a rotary evaporator. A light yellow powder remained. 400 of this powder were mixed with 590 g of ground glass fibres, 10 g of zinc stearate and 10 g of tert-butyl peroxide benzoate. To test the mechanical properties, test specimens were manufactured according to Example 7.

EXAMPLE 10

Mouldings for the mechanical and electrical test were manufactured from the pulverulent reaction mixture manufactured according to Example 9, under exactly the same conditions. However, before testing they were additionally post-cured for 4 hours at 220°C.

EXAMPLE 11

400 g of the pulverulent mixture of bis-diene I and bis-imide I manufactured according to Example 8 were thoroughly mixed with 580 g of ground glass fibres, 10 g of zinc stearate and 10 g of tert.-butyl peroxide benzoate. Test specimens for testing the mechanical and electrical properties were manufactured according to Example 7 from this mixture and were post-cured for 4 hours at 220°C.

EXAMPLE 12

A mixture of 300 g (0.806 mol) of bis-diene I and 150 g (0.70 mol) of bis-diene II in 112 g of xylene, 1,125 g (3.14 mols) of bis-imide I and 11.2 g of N-phenyl-β-naphthylamine were thoroughly mixed in 2,300 ml of chloroform. Thereafter the solvent was again stripped off completely and a light yellow powder was left. 400 g thereof were thoroughly mixed with 580 g of ground glass fibres, 10 g of zinc stearate and 10 g of tert.-butyl peroxide benzoate. For the mechanical and electrical test, test specimens were manufactured according to Example 8 from this mixture and were post-cured at 220°C for 4 hours.

COMPARISON EXAMPLE 2

For comparison purposes, 718 g (2.0 mols) of bisimide I were thoroughly mixed with 198 g (1.0 mol) of N,N'-diaminodiphenylmethane in accordance with Example 4 of French Patent Specification No. 1,555,564. 400 g of this mixture were mixed with 590 g of ground glass fibres and 10 g of zinc stearate. To manufacture the test specimens according to Example 7, this mixture however had to be pressed at 200°C for 8 minutes. At 160°C the speed of reaction was too slow so that the organic substance flowed out of the mould.

The results of the mechanical and electrical tests are listed in Table II.

A comparison of the compression moulding compositions manufactured according to Example 7–12 with the compression moulding composition obtained according to Comparison Example 2 shows that the flexural strength and impact strength is somewhat lower for the compression moulding compositions manufactured from the mixtures according to the invention, but that the compositions show, on average, the same heat distortion point as the compression moulding composition employed for comparison.

On the other hand, the compression moulding compositions according to the invention show distinctly better dielectric properties than the compression moulding composition manufactured according to Comparison Example 7:

The dielectric loss factor remains below 1% at frequencies up to $10^6$ Hz and only rises insignificantly between 50 and $10^3$ Hz. On the other hand, the dielectric loss factor rises to 1.33% to $10^6$ Hz for the compression moulding composition employed by way of comparison and the rise between 50 and $10^3$ Hz, from 0.38% to 1.00%, is much steeper.

The dielectric constants of the compression moulding compositions according to the invention vary only between 3.7 and 4.8 between 50 and $10^6$ Hz, whilst they vary between 4.7 and 6.3 for the compression moulding composition employed by way of comparison.

The specific volume resistance is always higher for the compression moulding compositions according to the invention than for the compression moulding composition employed by way of comparison. After storing the samples according to Examples 7–12 in water for 24 hours, the specific volume resistance on average decreases by 1–2 powers of 10, whilst in the case of the compression moulding composition according to Comparison Example 2 it even decreases by 6 powers of 10.

80% strength solution of bis-diene I in xylene are added thereto, whilst stirring well. The homogeneous mixture thus obtained is cooled to room temperature and diluted to 90 cP at 25°C by adding 300 parts of dioxane.

The impregnating solution, which is now ready, is converted to laminates in accordance with the process described in Example 13 and using the same curing cycle.

EXAMPLE 15

370 g (1.035 mols) of the bis-imide I are dissolved in 455 parts of dioxane at 85°C. 780 g (2.18 mols) of an 80% strength solution of bis-diene I in xylene are di- Table II

| Compression moulding compositions according to Example | 7 | 8 | 9 | 10 | 11 | 12 | Comparison 2 |
|---|---|---|---|---|---|---|---|
| Flexural strength according to DIN 53,453 (kg)cm²) | 535 | 510 | 400 | 520 | 470 | 485 | 545 |
| Impact strength according to DIN 53,453 (cm kg/cm²) | 4.0 | 3.1 | 2.5 | 3.4 | 4.2 | 3.1 | 4.2 |
| Heat distortion point according to DIN 53,458 (°C) | 223 | 217 | 187 | 230 | 234 | 242 | 228 |
| Loss factor tgδ         50 Hz | 0.21 | 0.29 | | 0.27 | 0.25 | 0.26 | 0.38 |
| according to at       $10^3$ Hz | 0.31 | 0.27 | | 0.32 | 0.32 | 0.29 | 1.00 |
| DIN 53,483              $10^6$ Hz | 0.76 | 0.77 | | 0.88 | 0.88 | 0.97 | 1.33 |
| Dielectric constant     50 Hz | 4.4 | 4.7 | | 4.4 | 4.1 | 4.3 | 4.9 |
| (γ) according to at   $10^3$ Hz | 4.4 | 4.8 | | 4.5 | 4.2 | 4.3 | 6.3 |
| DIN 53,483              $10^6$ Hz | 3.7 | 3.9 | | 3.6 | 3.7 | 3.7 | 4.7 |
| Specific volume resistance according to DIN 53,482, dry (Ω. cm) | $8.10^{15}$ | $9.6.10^{16}$ | | $7.7.10^{15}$ | $1.2.10^{17}$ | $6.4.10^{16}$ | $3.5.10^{15}$ |
| after storage in water for 24 hours at 25°C | $1.2.10^{15}$ | $1.9.10^{14}$ | | $9.2.10^{14}$ | $1.5.10^{14}$ | $1.5.10^{15}$ | $2.6.10^9$ |
| Surface resistance according to DIN 53,482, dry (Ω) | $>10^{14}$ | $>10^{14}$ | | $>10^{14}$ | $>10^{14}$ | $>10^{14}$ | $>10^{14}$ |
| after storage in water for 24 hours at 25°C | $>10^{13}$ | $>10^{12}$ | | $>10^{13}$ | $>10^{13}$ | $>10^{13}$ | $>10^{13}$ |

C. Manufacture of glass fibre-reinforced laminates

EXAMPLE 13

370 g (1.035 mols) of N,N'-4,4'-diphenylmethane-bis-maleimide (bis-imide I) are dissolved in 740 ml of dioxane at 80°–100°C. 370 g (0.795 mol) of an 80% strength solution of oligomeric α,α'-bis-(cyclopentadienyl)-2,3,5,6-tetrachloro-p-xylene (bis-diene I) are added thereto, whilst stirring well. A homogeneous mixture results, which is stirred for 3–4 hours at 80°C. In the course thereof, the viscosity, measured at 25°C, rises from 30 cP to 1,000 cP. The adduct solution thus obtained is cooled to room temperature and can be stored for several months at room temperature.

The adduct solution obtained is diluted to 90 cP by adding 800 ml of dioxane and is used to impregnate a glass fabric weighing 280 g per m² and containing vinyl-tris(-betamethoxyethoxy)-silane ("A-172", a tradename of Messrs. Union Carbide) as an adhesion promoter. The impregnation of the glass fabric is carried out by the dipping process. The resulting, moist fabric web is thereafter dried for 5 minutes in a circulating air oven at a temperature of 140°C and is then cut, stacked into bundles for pressing, and pressed in a platen press at 170°C between two high-gloss copper foils. Initially, the press is kept under light contact pressure for 30 seconds, and thereafter the pressure is raised to 20 kp/cm² and the temperature is raised to 200°C over the course of 15 minutes. After 1 hour, the pressing is removed from the press and is post-cured for a further 6 hours in an oven at 240°C. A tough, heat-resistant laminate of good mechanical properties is obtained.

EXAMPLE 14

370 g (1.035 mols) of the bis-imide I are dissolved in 455 ml of dioxane at 85°C. 370 g (0.795 mol) of an luted with 280 ml of dioxane and added to the hot solution of the bis-imide I, whilst stirring well. The homogeneous mixture thus obtained is cooled to room temperature and diluted to 90 cP at 25°C by adding dioxane. It is subsequently converted into laminates according to the process described in Example 13 and using the same curing process.

COMPARISON EXAMPLE 3

For comparison purposes, 100 parts of oligomeric α,α'-bis-(cyclopentadienyl)-2,3,5,6-tetrachloro-p-xylene and 0.5 part of di-tert.-butyl peroxide-butane were stirred into 100 parts of a mixture of equal parts of toluene and xylene to give a homogeneous impregnating solution, in accordance with Example F of British Patent Specification No. 1,171,061.

The solution was converted into pre-impregnated glass fabric webs in accordance with the process described in Example 16. The impregnated, dried fabric webs were subsequently pressed between two high-gloss copper foils in a platen press at a temperature of 200°C. The press is first kept under light contact pressure for 4 minutes and thereafter the pressure is raised to 20 kp/cm². After 2 hours, the pressing is taken out of the press and post-cured for a further 4 hours in an oven at 200°C.

The results of the mechanical and electrical tests are listed in Table III.

A comparison of the laminates manufactured according to Examples 13–15 with the laminate manufactured according to Comparison Example 3 shows that the laminates manufactured from the mixtures according to the invention behave substantially better, in respect of flexural strength and impact strength, after a heat aging at 220°C.

A completely surprising aspect of the laminates manufactured from the mixtures according to the invention is the variation in the torsional modulus G as a function of the temperature, according to ASTM 1,053 or ISO 1,432 (Geman test). FIG. 1 shows the torsional modulus values as a function of the temperature whilst FIG. 2 indicates the difference between the angle of recovery and the zero position as a function of the temperature. The maximum of the curve B in FIG. 2 corresponds to the point of inflection of curve B in FIG. 1 and to the position of the glass transition range of the cured resin. Furthermore, both tests provide information on the mechanical-thermal behaviour of the laminate over a wide temperature range. They serve to indicate the temperature ranges in which the laminate shows hard, tough or soft-elastic behaviour.

Figure 2:
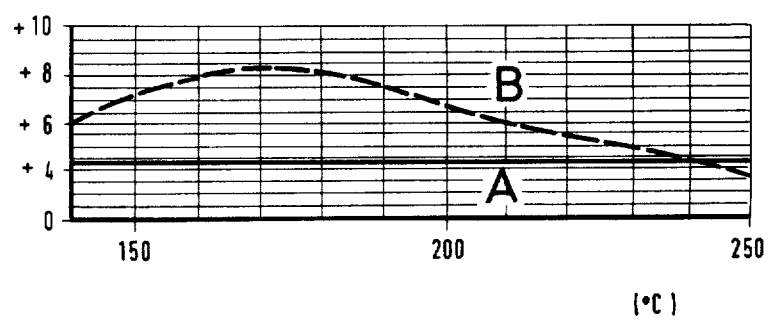

Whilst in the case of the laminate according to Comparison Example 3 the glass transition range (softening range) is already noted at 170°–180°C, the laminates manufactured from the mixtures according to the invention show no change in the variation of the torsional modulus G up to temperatures above 250°C. Curve B of FIG. 2 shows that the softening range only occurs at temperatures which lie above 250°C.

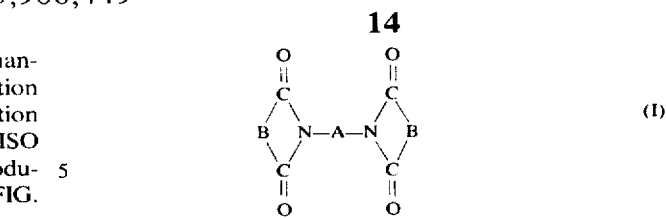

in which A denotes a divalent organic radical with at least 2 and at most 30 carbon atoms and B denotes a radical of the formulae

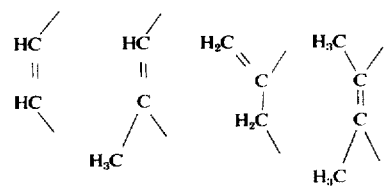

and (b) dimeric or oligomeric halogen-containing bis-(cyclopentadienyl), compounds of the general formula Table III

| Laminates according to Example | 13 | 14 | 15 | Comparison 3 |
|---|---|---|---|---|
| Resin content of the laminate sheets (%) | 37–39 | 35–37 | 40 | 39–40 |
| Flexural strength according to DIN 53,452 (kg/mm²) | | | | |
| Initial value | 47.0 | 46.6 | 49.3 | 45.0 |
| after 1,000 hours aging at 220°C | 38.0 | 35.2 | 35.0 | 25.0 |
| Impact strength according to DIN 53,458 (cmkg/cm²) | | | | |
| Initial value | 155 | 150 | 150.3 | 182 |
| after 1,000 hours aging at 220°C | 120 | 115 | 118 | 102 |
| Dielectric loss factor tgδ according to DIN 53,483 | | | | |
| at 20°C/10³ Hz | 1.22 | 1.43 | 2.13 | 1.56 |
| at 100°C/50 Hz | 0.43 | 0.45 | 0.78 | 0.62 |
| at 200°C/50 Hz | 0.52 | 0.65 | 0.90 | 2.24 |
| Dielectric constant according to DIN 53,483 | | | | |
| at 20°C/10³ Hz | 4.4 | 4.6 | 4.2 | 3.9 |
| at 100°C/50 Hz | 4.3 | 4.4 | 4.2 | 3.9 |
| at 200°C/50 Hz | 4.3 | 4.3 | 4.0 | 4.0 |
| Specific volume resistance according to DIN 53,482 (Ω. cm) | | | | |
| Initial value | $9.2 \times 10^{15}$ | $8.4 \times 10^{15}$ | $9.8 \times 10^{15}$ | $4.0 \times 10^{15}$ |
| after 96 hours storage at 96% relative humidity, 25°C | $5.6 \times 10^{14}$ | $4.4 \times 10^{14}$ | $1.1 \times 10^{14}$ | $2.9 \times 10^{14}$ |

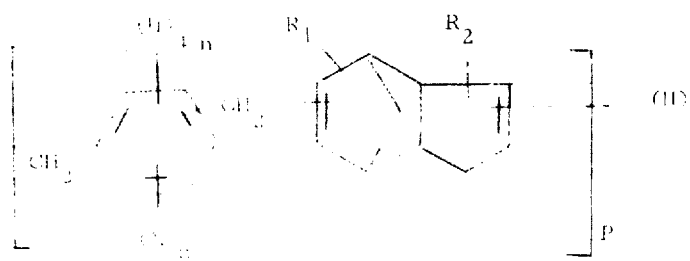

What we claim is:

1. Storage-stable, thermosetting mixtures which are characterised in that they contain (a) N,N'-bis-imides of unsaturated dicarboxylic acids of the general formula in which X denotes a fluorine, chlorine or bromine atom, $R_1$ and $R_2$ each denote a hydrogen atom or a methyl group, $n$ denotes an integer having a value of at least 1 and at most 4 and P denotes a number having a value of 2 to 20, it being optionally possible for component (b) to be replaced, to the extent of up to 50 mol per cent by bis-(cyclopentadienyl) compounds of the formula III

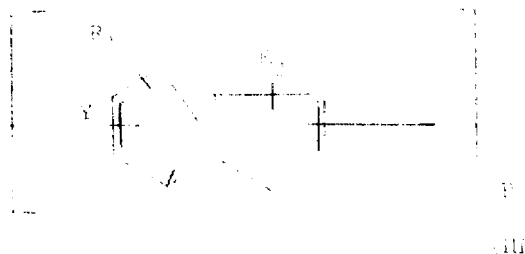

in which Y denotes a radical of the formulae

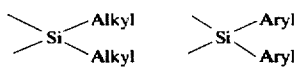

or a divalent aliphatic, cycloaliphatic, araliphatic or aromatic hydrocarbon radical, the molar ratio of N,N'-bis-imides of formula I to the bis-(cyclopentadienyl) compounds of formula II and optionally III being about 1:4 to 4:1.

2. Mixtures according to claim 1, characterised in that they contain (a) N,N'-bis-imides of the formula I in which A represents an unsubstituted or chlorine-substituted radical of the formula

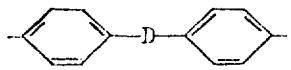

wherein D denotes an oxygen atom or the methylene group, and (b) oligomeric bis-(cyclopentadienyl) compounds of the formula II, in which $n$ is 4, X denotes a chlorine atom and $R_1$ and $R_2$ each denote a hydrogen atom, it being optionally impossible for component (b) to be replaced to the extent of up to 50 mol per cent by oligomeric bis-(cyclopentadienyl) compounds of the formula III, in which Y denotes a divalent aliphatic radical, especially the hexamethylene radical, and $R_1$ and $R_2$ have the same meaning as above.

3. Mixtures according to claim 1, characterised in that the molar ratio is 1:2 to 2:1.

4. Mixtures according to claim 1, characterised in that they contain N,N'-4,4'-diphenylmethane-bis-maleimide as the N,N'-bis-imide of the formula I.

5. Mixtures according to claim 1, characterised in that they contain N,N'-4,4'-3,3'-dichlorodiphenylmethane-bis-maleimide as the N,N'-bis-imide of the formula I.

6. Mixtures according to claim 1, characterised in that they contain N,N'-4,4'-diphenyl-ether-bis-maleimide as the N,N'-bis-imide of the formula I.

7. Mixtures according to claim 1, characterised in that they contain oligomeric α,α'-bis-(cyclopentadienyl)-2,3,5,6-tetrachloro-p-xylene as the halogen-containing bis-(cyclopentadienyl) compound of the formula II.

8. Mixtures according to claim 1, characterised in that they contain oligomeric 1,6-hexamethylene-bis-cyclopentadiene as the bis-(cyclopentadienyl) compound of the formula III.

* * * * *

UNITED STATES PATENT OFFICE
CERTIFICATE OF CORRECTION

Patent No. 3,900,449    Dated August 19, 1975

Inventor(s) Heinz Rembold, Theobald Haug, Sigfried Wyler and Jurg Kiefer

It is certified that error appears in the above-identified patent and that said Letters Patent are hereby corrected as shown below:

Column 16, line 5, the word "impossible" should read

---possible---

Signed and Sealed this

Twenty-seventh Day of July 1976

[SEAL]

Attest:

RUTH C. MASON
*Attesting Officer*

C. MARSHALL DANN
*Commissioner of Patents and Trademarks*